June 12, 1923.
V. A. HANCOCK
DIRIGIBLE HEADLIGHT
Filed Aug. 31, 1921
1,458,761
2 Sheets-Sheet 1
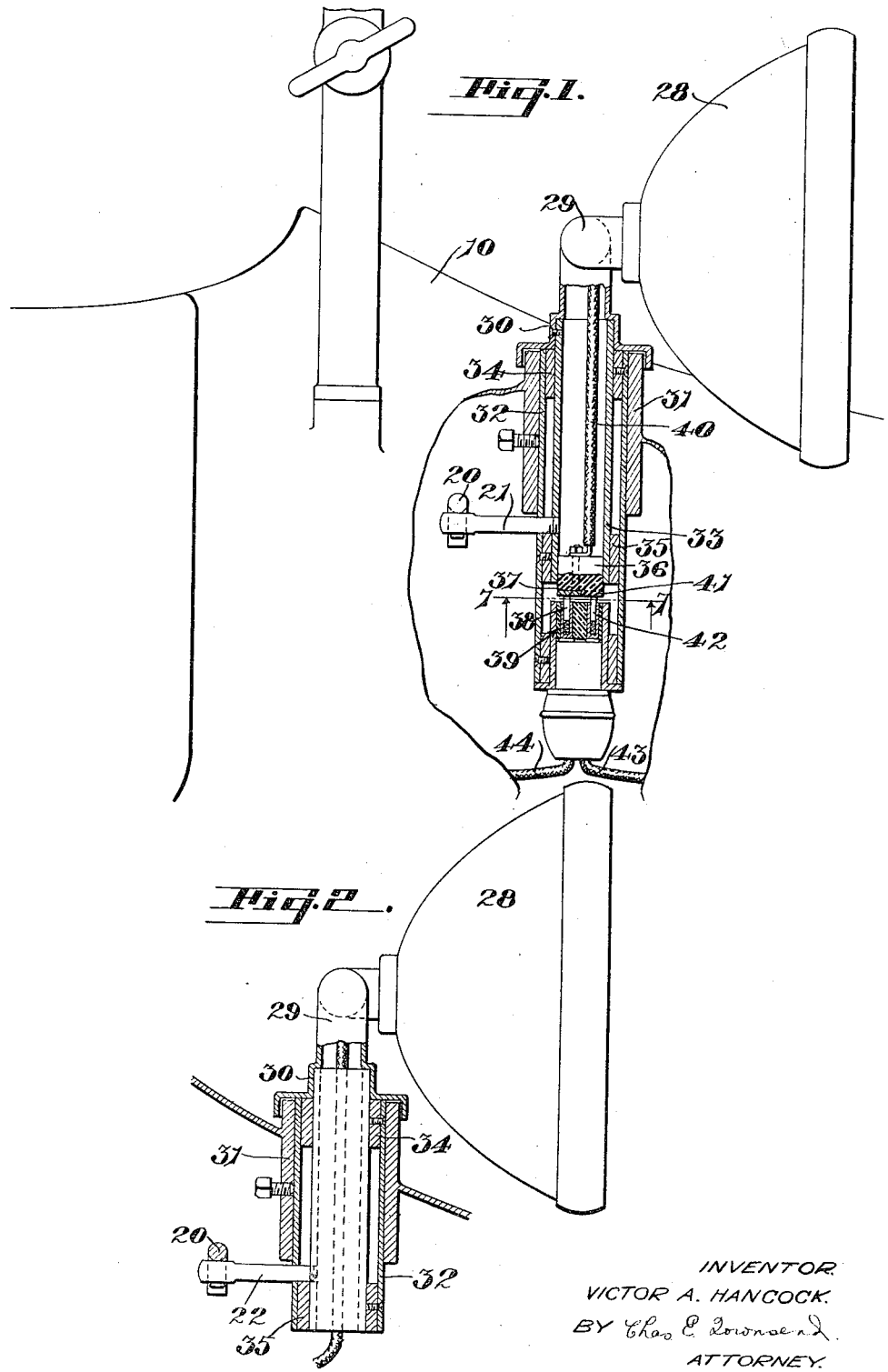
INVENTOR.
VICTOR A. HANCOCK.
BY Chas E Townsend
ATTORNEY.

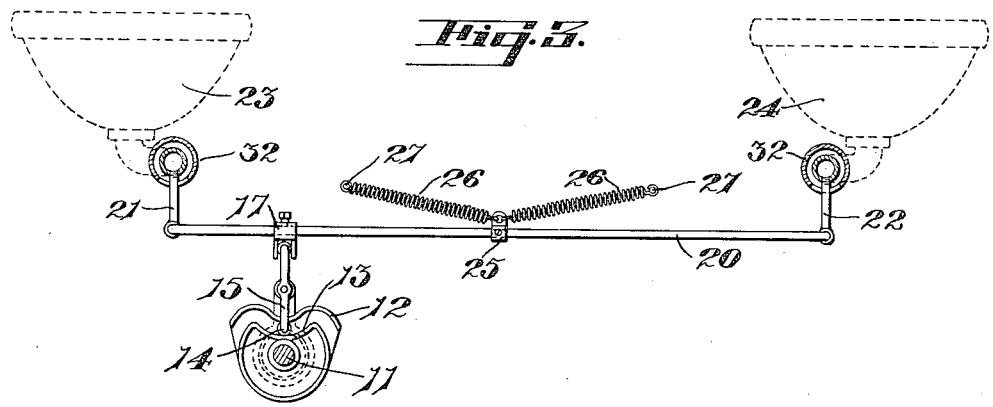
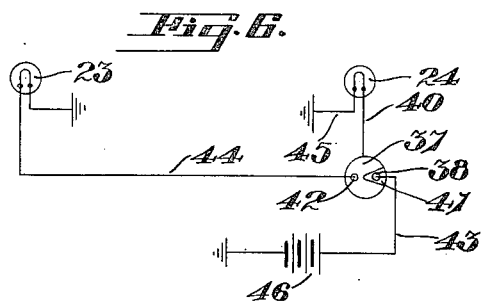
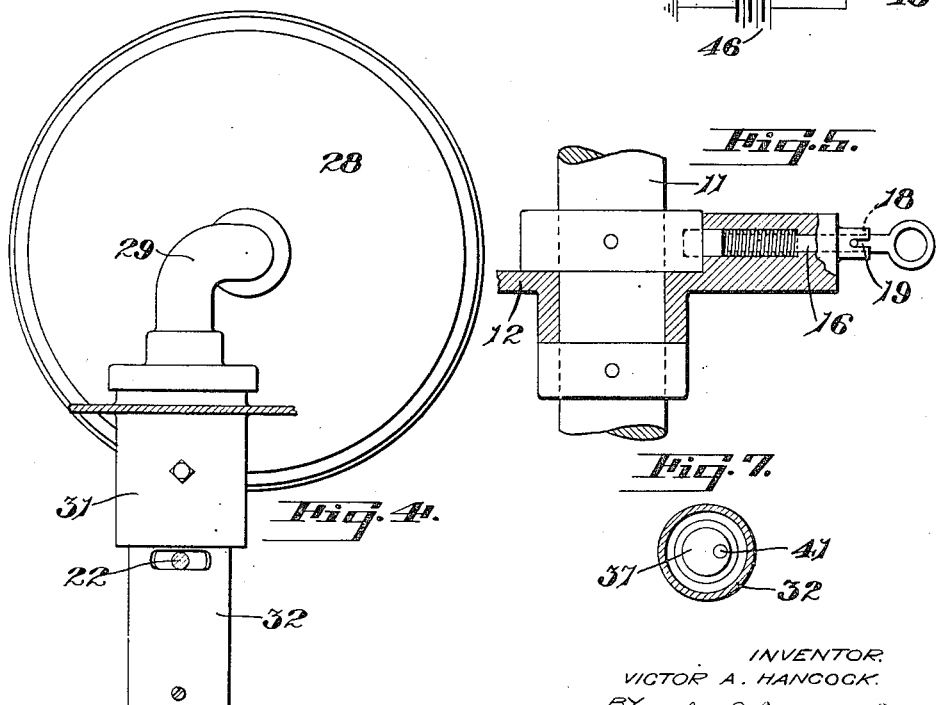
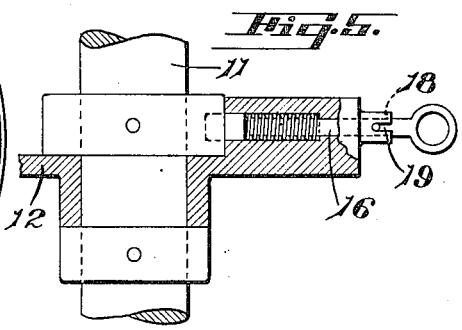
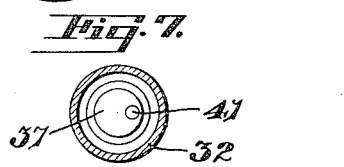

Patented June 12, 1923.

1,458,761

UNITED STATES PATENT OFFICE.

VICTOR A. HANCOCK, OF OAKLAND, CALIFORNIA.

DIRIGIBLE HEADLIGHT.

Application filed August 31, 1921. Serial No. 497,235.

*To all whom it may concern:*

Be it known that I, VICTOR A. HANCOCK, a citizen of the United States, residing at Oakland, in the county of Alameda and State of California, have invented new and useful Improvements in Dirigible Headlights, of which the following is a specification.

This invention relates to automobile accessories, and particularly pertains to dirigible headlights therefor.

Heretofore it has been common practice, in providing vehicles with headlights which swing in unison with the steering wheels of the vehicle, to directly connect the conventional lights with the steering mechanism. This practice is attendant by numerous objections, such as the constant wear and vibration on the mounting of the lights, the lack of necessity for always swinging the lights and the requirement of an elaborate operating mechanism therefor.

It is the principal object of the present invention to provide auxiliary dirigible lights, independent of the main headlights, and which lights may be actuated after a predetermined angle of turn has been negotiated, therafter becoming focused in advance of the path of travel of the vehicle and at the same time being illuminated; all of which structure is embodied in a simple and direct operating mechanism.

The present invention contemplates the use of spotlights pivoted to swing horizontally, and which lights are supported in a bearing structure embodying an intermittently acting switch adapted to become effective when the lights have been turned through a determined angle of rotation, said lights being equipped with operating mechanism connecting with the steering gear of the vehicle, whereby the swinging action may take place, said operating mechanism being fitted with means for rendering it inoperative, if desired.

The invention is illustrated by way of example in the accompanying drawings, in which—

Fig. 1 is a view in side elevation, showing a fragmentary portion of a vehicle body to which the lights are applied and which view shows parts broken away to more clearly disclose the details of construction of the lamp supports.

Fig. 2 is a view in vertical section and elevation, showing the light structure which does not require a switch mechanism.

Fig. 3 is a view in plan, showing the operating mechanism of the lights.

Fig. 4 is an enlarged view in rear elevation, showing one of the lamps and its mounting.

Fig. 5 is a fragmentary view in section and elevation, showing the lock member and the oscillating lever.

Fig. 6 is a diagrammatic view of the electric system.

Fig. 7 is a view in section and elevation, as seen on the line 7—7 of Fig. 1, showing one of the switch members.

Referring more particularly to the drawing, 10 indicates the body of an automobile, which structure is supported upon a suitable main frame and a running gear (not shown in the drawings). It is to be understood that the forward wheels of the running gear are adapted to be swung to determine the course of travel of the vehicle, said swinging movement being effected by a steering shaft 11, as shown in Fig. 3.

The steering column 11 carries a cam 12 which is substantially crescent-shaped, being concentrically arranged around its rotating axis throughout approximately ¾ of its circumference and having a recessed portion 13 extending across the remaining perimeter. The circumferential edge of the cam is borne against by a roller 14, which is supported from and at right angles to a lever 15. The cam is provided with a lock bolt 16 which permits the cam to become disengaged from the shaft 11 when movement of the lamps is not required. A shoulder is formed at the end of this lock bolt and against which a spring 17 acts. This spring normally holds the member in locked relation to the hub of the cam 12 and with the outwardly extending shaft seated within one of the recesses 18 or 19 of the hub.

The lever 15 engages a fork on a cross-rod 20. This rod is secured at its opposite ends to arms 21 and 22 of lamps 23 and 24. A collar 25 is fixed substantially midway between the ends of the rod 20 and secured thereto. Mounted upon the opposite sides of this collar are tension springs 26. The other ends of these are fixed at points 27 on the vehicle. It will thus be evident that the two springs will constantly act to hold the rod in an intermediate position and the headlights both focused directly along the roadway. The headlights themselves are composed of the usual lamp unit 28 which is supported upon a bracket 29. The bracket 29 is here shown as being offset, so that the lamps will not interfere with the cowl of the vehicle body. These brackets are formed with enlarged hub portions 30 extending down over the upper end of a tubular bearing 31. The bearings 31 may be formed as a part of the vehicle body, if desired, or may be embodied in separate brackets when necessary.

The bearings are fitted with an inner tubular casing 32 which serves as a housing and support for the stem 33 of the lamp bracket. This stem is tubular and is secured to the bracket portion 29. Bushings 34 and 35 are interposed between the opposite ends of the stem 33 and the casing 32, thus supporting the stem in a manner to permit free rotation thereof.

Secured at the lower end of the lamp stem 33 is an insulating block 36. This block is formed, as shown in Fig. 7, with a metal contact 37. This segment is adapted to be engaged by a contact pin 38 of an attachment plug 39. The segment is electrically connected to a wire 40 leading upwardly through the stem to one terminal of the electric lamp enclosed within the structure 28. The other terminal of this lamp is, of course, grounded on some portion of the machine. The contact plate has a cut-out portion 41 which is filled with a non-conductive material, so that when the contact pin 38 is in engagement therewith the electric circuit will be interrupted.

The fixture 39 is formed with another contact pin 42 which also bears against the end of this plate 37. These pins are yieldably held by means of springs and are electrically connected to wires 43 and 44.

When the lamp is swung by the levers 21, which extend through slots in the casing 32 they will move for a distance represented by the dimension of the non-conductor 41 before establishing a circuit through the lamp, and after the pin 38 encounters the metal plate 37 the circuit will be established. It will be evident that this structure will not be required on both of the lamps as they are controlled by the same switch; the wiring diagram being shown in Fig. 6. For this reason the lamp mounting which does not embody a switch is simplified, as clearly shown in Fig. 2.

In the operation of the present invention, the lamps are suitably mounted within their bearings and are electrically connected with a source of supply, as shown in Fig. 6. When the steering shaft 11 is rotated, it will swing the eccentric 12. For a short interval this eccentric will not materially influence the roller 14 and the lever 15, but when considerable turning movement has taken place, the roller 14 will be shifted and the bar 20 moved.

After the roller has been shifted a distance sufficient to permit it to clear the point of the eccentric, the main circumferential face of the eccentric will hold the lamps in this turned position until the eccentric is restored to its original position, as shown in Fig. 3. One of the springs 26 will be at all times acting against the eccentric, and when the member 12 is returned to its original position will insure that the two lights are focused directly ahead.

In the event that the dirigible action of the headlights is not required the shank 16, carrying the roller 14, may be turned a quarter of a revolution relative to the lever 15, and thereafter locked by the spring 17 which will hold the shank in one of the recesses 18 or 19.

Reference being had to Fig. 6, it will be seen that the two headlights 24 and 23 are wired in parallel and that one of the wires is grounded, as indicated at 45, while the opposite wires 40 lead to the switch mechanism shown in Fig. 1. Wire 40 from the lamp 24 is secured to the contact plate 37, while wire 44 is secured to the contact pin 42. A battery 46 or other source of supply is connected with the contact pin 38 by a wire 43, while the other pole of the battery is grounded. It will thus be evident that when the plate 37 is rotated to bring the pin 38 in contact with the plate, both of the lights will be simultaneously illuminated. It will be further evident that by reversing the position of the pins a circuit will be continuously established through both of the lights.

It may also be found desirable to arrange the headlights so that they will be illuminated at all times. If this is required, the connecting plug 39 may be removed and rotated a quarter turn to change the positions of the pins 38 and 42. When the plug is re-inserted, the lights will be continuously illuminated, irrespective of their swinging action.

It will thus be seen that by the arrangement here disclosed a system of dirigible headlights may be provided for a vehicle without interfering with the present lighting system, and that said headlights may be turned a required amount necessary for passing vehicles and the like without closing their electric circuit, all of which is brought about by an inexpensive operating mechanism.

While I have shown the preferred form of my invention as now known to me, it will be understood that various changes might be made in the combination, construction and arrangement of parts by those skilled in the art without departing from the spirit of the invention as claimed.

Having thus described my invention, what I claim and desire to secure by Letters Patent is—

1. In combination with the steering mechanism of an automobile, a pair of headlights mounted upon vertical axes, an arm extending from the vertical spindle of each of said lights, a connecting rod secured to the ends of said arms, spring means for normally holding said rod and arms in an intermediate position, an operating arm secured to the rod, and a cam operated by the steering mechanism and engaging said arm whereby rotation of the cam in opposite directions will produce alternate shifting movement of the connecting rod and swinging movement of the spindle arms.

2. In combination with the steering mechanism of an automobile, a pair of headlights mounted upon vertical axes, an arm extending from the vertical spindle of each of said lights, a connecting rod secured to the ends of said arms, spring means for normally holding said rod and arms in an intermediate position, an operating arm secured to the rod, a cam operated by the steering mechanism and engaging said arm whereby rotation of the cam in opposite directions will produce alternate shifting movement of the connecting rod and swinging movement of the spindle arms, and means whereby the operating arm may be moved out of engagement with the cam to prevent the movement of the headlights as the steering mechanism is operated.

3. A dirigible headlight comprising a vertical bearing, a casing member secured within said bearing and extending from the lower end thereof, a spindle rotatably supported within said casing member, a headlight carried at the upper end of the spindle, a collar formed on the spindle and resting against the upper end of the bearing for the support of the spindle, a switch member secured in the lower end of the spindle, said member embodying a contact plate, and contact means carried at the lower end of the bearing casing and adapted to rest against said plate, whereby an electric circuit will be established through the headlight.

4. A dirigible headlight comprising a vertical bearing, a casing member secured within said bearing and extending from the lower end thereof, a spindle rotatably supported within said casing member, a headlight carried at the upper end of the spindle, a collar formed on the spindle and resting against the upper end of the bearing for the support of the spindle, a switch member secured in the lower end of the spindle, said member embodying a contact plate, and contact means carried at the lower end of the bearing casing and adapted to rest against said plate, whereby an electric circuit will be established through the headlight, said contact place being cut away to interrupt the flow of electricity therethrough when the headlight is in certain positions.

5. In combination with the steering mechanism of an automobile, a pair of headlights mounted upon vertical axes, an arm extending from the vertical spindle of each of said lights, a connecting rod secured to the ends of said arms, spring means for normally holding said rod and arms in an intermediate position, an operating arm secured to the rod, and a cam operated by the steering mechanism and engaging said arm whereby rotation of the cam in opposite directions will produce alternate shifting movement of the connecting rod and swinging movement of the spindle arms, and means whereby the operating rod will be unaffected by movement of the cam until the latter has been rotated a predetermined distance.

6. In combination with the steering mechanism of an automobile, a pair of headlights mounted upon vertical axes, an arm extending from the vertical spindle of each of said lights, a connecting rod secured to the ends of said arms, spring means for normally holding said rod and arms in an intermediate position, an operating arm secured to the rod, a cam operate by the steering mechanism and engaging said arm whereby rotation of the cam in opposite directions will produce alternate shifting movement of the connecting rod and swinging movement of the spindle arms, an electric circuit including a lamp in said headlights, and a switch mechanism located at the lower end of one of said spindles and actuated by turning movement of the spindle to make and break said electric circuit.

VICTOR A. HANCOCK.